Dec. 14, 1943.  P. SLAVENS  2,336,809
OPTICAL INSTRUMENT
Filed Oct. 4, 1941

INVENTOR
Philip Slavens
BY Scott L. Nourse
ATTORNEYS

Patented Dec. 14, 1943

2,336,809

UNITED STATES PATENT OFFICE 2,336,809

OPTICAL INSTRUMENT

Philip Slavens, Maricopa County, Ariz.

Application October 4, 1941, Serial No. 413,613

1 Claim. (Cl. 88—2.3)

This invention relates to optical instruments adapted to assist the pilot of an airplane in locating the position of the airplane relative to the landing field, in his approach for a landing.

More particularly, it relates to devices which enable the pilot of an airplane to determine the "spot" where an airplane may be landed from a given height, taking into consideration the gliding angle of the plane and other variables such as wind and air speed of plane.

The objects of the invention are:

To provide a device which may be held in the hand of an airplane pilot, simple in construction and easy to operate, whereby the pilot may take his sight on any given landing spot to determine whether his plane has the correct altitude to land on said spot;

A further object is to provide a device having a dual vision, one portion thereof having a cross bar to enable a sight to be taken directly at a given landing spot; the other portion of the vision being transmitted through mirrors so that the horizon line may be seen to coincide with the sighting bar in the line of sight first mentioned, or with the landing spot;

A further object is to provide an optical instrument having two lines of sight divided in a vertical plane; one line of sight being adapted to be directed on a given object or landing spot and the other definitely adjustable mechanically in a horizontal plane; said adjustments to compensate for variations in gliding angle, gliding speed, and wind velocity;

A still further object includes a device as just above described, in which the adjustment of one line of sight is provided with mechanism for a fixed definite adjustment on which is superimposed an easily manipulated, manually operated fine adjustment, having a visible scale.

Other objects will appear hereinafter.

I attain the foregoing objects by means of the device illustrated in the accompanying drawing, in which Figure 1 is a side elevation of the device herein concerned;

Similar numerals refer to similar parts in the several views.

Figure 1:
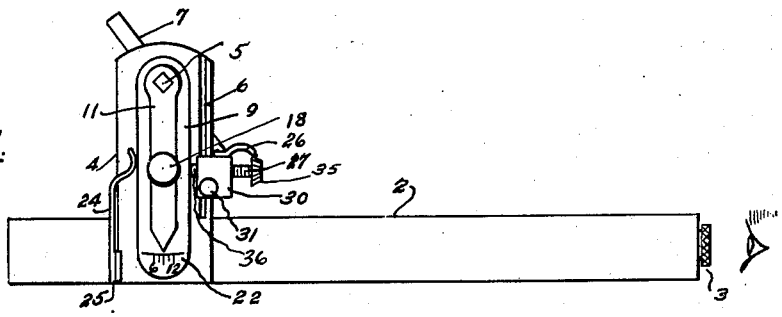
Figure 2:
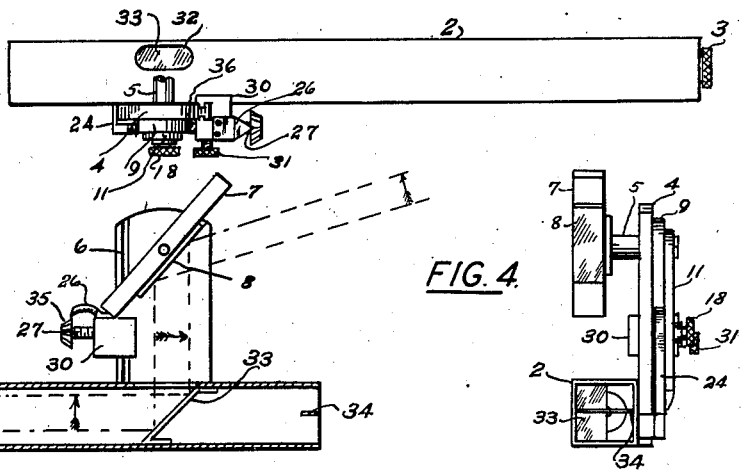
Figure 2 is a plan view thereof.
Figure 3:
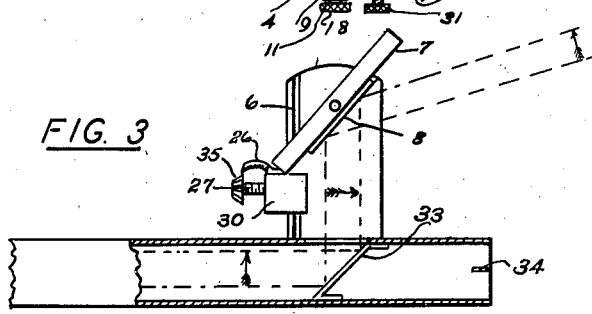
Figure 3 is a side elevation of the back with portions of the sighting tube cut away to show interior construction.

The body of the instrument in the form herewith illustrated, consists of a square tube of brass or other suitable material. Near the right end, Figure 1, is an eye piece 3 which may consist of a simple aperture which, for the purposes of an easy understanding of the device, may be considered as fixed, although an adjustable aperture or even a lens structure may be substituted. Near the opposite end, which I term the objective end, there is an upwardly extending bracket 4 securely fastened to the body 2. Near the upper end of this bracket a hole is drilled to receive a shaft 5, called the adjusting mirror shaft. Along the right hand edge of this bracket there are grooves 6 on both the inner and outer sides. The mirror supporting shaft 5 supports a mirror frame 7 on its outer end and a mirror 8 is attached to this frame. This shaft extends through the bracket 4 which acts as a bearing and through the upper end of the secondary adjustment bar 9, which is provided with a hole 10 which floats on this shaft. The shaft passes on through this bar to the primary adjustment bar 11 into which it is fixed by a squared shoulder as indicated at 12. Primary adjustment bar is adjustably secured to the secondary adjustment bar by means of a burred thumb screw 18 which is threaded into hole 19 in the bar 9, while a friction face of the screw bears on either side of an arcuate slot 20 in the primary adjustment bar 11. By this means these two bars may be locked to move together. The lower end of the primary adjustment bar is provided with a pointer 21 which indicates on a scale 22 on the secondary adjustment bar.

A spring 24 attached near the lower end of bracket 4 by means of a block 25 normally urges secondary adjustment bar 9 in a counterclockwise direction and causes the right edge of it to bear upon the end 36 of the secondary adjustment screw 27. This screw is threaded to screw through a block 30. This block is grooved out on its left hand or forward edge to fit in and be retained by the metal of bracket 4 on either side of grooves 6. Its vertical position is adjustable in these grooves but is maintained in position by the set screw 31. Since primary adjustment bar 11 may be locked to turn with secondary adjustment bar 9 and the arcuate position of this bar may be adjusted by screw 27 relative to its axial support, mirror 8 may be adjusted by a manipulation of screw 27 by use of knob 35.

Figure 4:
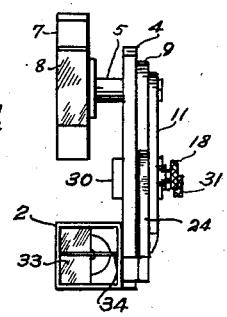
Figure 4 is an elevation of the objective end thereof.

Mirror support 7 is normally set at an angle slightly greater than forty-five degrees to the horizontal or central axis of the body 2. This mirror is aligned laterally so that it reflects downwardly through an opening 32 in the outer or right hand edge of body 2 and so that rays so reflected strike a mirror 33 within body 2 positioned at an angle of forty-five degrees to the axis thereof with its reflecting face exposed to the eye piece end of the body. Mirror 33 is stationary and is used merely to direct the rays observed in the eyepiece upward so that the angle may be adjusted by mirror 8. Mirror 33 also extends across only one-half of the sectional area of tube 2, the other half being open as shown particularly in Figure 4. A bar 34 extends horizontally across the middle of the tube near the objective end and acts as a centering pointer or alignment for the direct vision through this half of the device.

Figure 7:
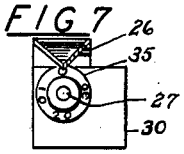
Figure 7 is a front elevation of the adjusting knob drawn on a somewhat enlarged scale.
Figure 5:
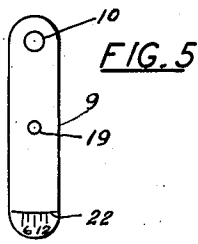
Figure 5 is an elevation of the secondary adjustment bar.
Figure 6:
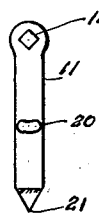
Figure 6 is a side elevation of the primary adjustment bar.
Figure 8:
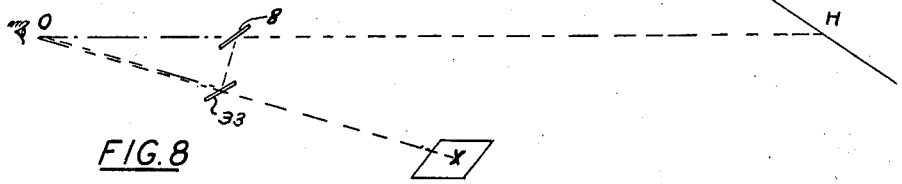
Figure 8 is a schematic diagram illustrating the use of the device.

The knob on screw 27 is provided with an angular face. As shown in Figure 7, this face may be provided with a number of varying wind indicating velocities 35, providing adjustment for said wind velocities by turning screw 27 relative to a pointing indicator 26 affixed to block 30. It is obvious from the foregoing that the rotative effect of adjusting screw 27 may be increased or diminished by changing the vertical position of block 30 in grooves 6. As the block is raised the center of screw 27 has a greater rotative effect upon bar 9.

In use, the pilot of an airplane, desiring to land, while gliding parallel to the end of the field, sights the horizon through the instrument, thus setting the instrument at a downward angle equal to the gliding angle of the airplane so that a spot indicated by X is within the field of vision of the inner or unobstructed portion of tube 2, using bar 34 as a definite spotting line. The spot X is where the pilot would land, if he were to turn in toward the spot at the instant of taking the sight. The pilot therefore continues to lose altitude until the spot on which he desires to land appears to coincide with the horizon, as viewed through the instrument, whereupon he immediately makes his ninety degree turn in for the final glide and a landing.

Vision through the other side of the instrument is reflected upward by mirror 33 and outward at a definite predetermined angle by mirror 8 until this line of vision meets the horizon. The object of this second line of vision is to provide the user with a definite predetermined level line which may be diagrammatically illustrated as OH and which, by adjustment of mirror 8, may have a definite reference to landing spot X as viewed by the direct line of vision through the instrument. The line OX will, under given conditions, represent a line of flight which the machine being operated will take from the observation point O to the landing spot X under given flying conditions. The angle at which mirror 8 is set then becomes important and is set according to the several varying factors which will permit the plane to glide along line OX. In the first instance, the natural gliding angle of the particular plane being operated is taken into consideration and this is provided for by the primary adjustment, that is, the adjustment between the primary adjustment bar 11 and secondary adjustment bar 9 by means of set screw 18. This primary adjustment may be conveniently indicated by indicia on scale 22 such as 1 to 6 or 1 to 12; meaning that the plane drops one foot vertically for every 6 or 12 feet travelled horizontally. If landings could all be made in still weather and under fixed atmospheric conditions the use of the secondary adjustment bar and its adjustment by means of screw 27 would not be necessary. However, due to varying wind conditions on a field over the spot at which a plane will land from a given height, the vertical position of the plane over the field with reference to the desired landing spot must be changed, and, therefore, the adjusting screw 27 affords an easy, feasible, and accurate means for further adjusting the angle of mirror 8 relative to the axis of vision OX.

The definite adjustment of screw 27 relative to a scale pointer 26 can be mathematically calculated in advance. The pilot then approaching a field having the primary adjustment of his instrument set to the proper gliding angle of his plane and also to the normal gliding airspeed of his plane, may, by either observing the wind cones on the field or by radio communication with the field weather bureau, set the instrument to the proper angle so that by observing the horizon through the instrument and positioning the plane so that the desired landing spot appears to coincide with the horizon line in the instrument, he may safely bring his plane in and land it on this spot. In other words, with the adjustments of mirror 8 properly made it is only necessary for the operator to glance through the instrument and maneuver his plane to a position where the desired landing spot and the horizon line coincide. He then makes his final ninety degree turn into the field to land.

From experience, it has been found that while pilots may accurately judge the proper height from which they start their landing glide in a known area, or where there are trees or other familiar land marks which enable them to judge height and distance, it is not easy for a pilot to make these same calculations in a field with which he is not familiar, particularly if there are no particular land marks of any height in the vicinity. The inability of the pilot to judge the correct height at which to begin his landing glide is increased where the pilot has been flying at high altitudes for a long time. Such inability to properly judge height often requires the pilot to re-circle the field to attain the right height, after "overshooting." This is obviously not desirable. Further, in the case of a forced landing with the dead stick it is highly important to properly judge the correct height at which to begin the landing glide because under these conditions re-circling the field is impossible and failure to make a landing on the desired available spot will often end in a crash.

I claim:

An optical instrument for determining the correct position of an airplane relative to a selected landing spot in order to make a correct landing thereon, comprising a sighting tube, an eye piece having an ocular aperture at one end, a horizontal cross bar at the objective end, mechanism for dividing vision therethrough to secure two lines of sight including a mirror positioned at an angle of forty-five degrees from the horizontal and facing said eye piece laterally blocking one-half of the vision through said tube and reflecting said vision as a line of sight vertically, a second mirror positioned on said tube above said first mirror on an axially adjustable transverse shaft to divert said line of vision at an angle vertically divergent from the axial line of sight through said tube, mechanism for adjusting and indicating the adjusted angular position of said second mirror including a primary adjusting bar affixed to said shaft having a pointer reading on indicia on a secondary adjustment bar in terms of gliding characteristics of an airplane, means for adjustably securing said primary adjusting bar to said secondary adjusting bar, a secondary adjusting bar, swingably positioned on said shaft, means for swinging adjusting movement of said secondary adjusting bar relative to said sighting tube including a threaded adjusting screw bearing thereon and having a head marked with indicia reading in terms of air speeds, and means for varying the position of said threaded adjusting screw so that the amplitude of its adjusting movement can be increased or decreased.

PHILIP SLAVENS.